Aug. 13, 1968          A. LEYER           3,396,618
                        COLD SAW
Filed May 31, 1966                   4 Sheets-Sheet 1
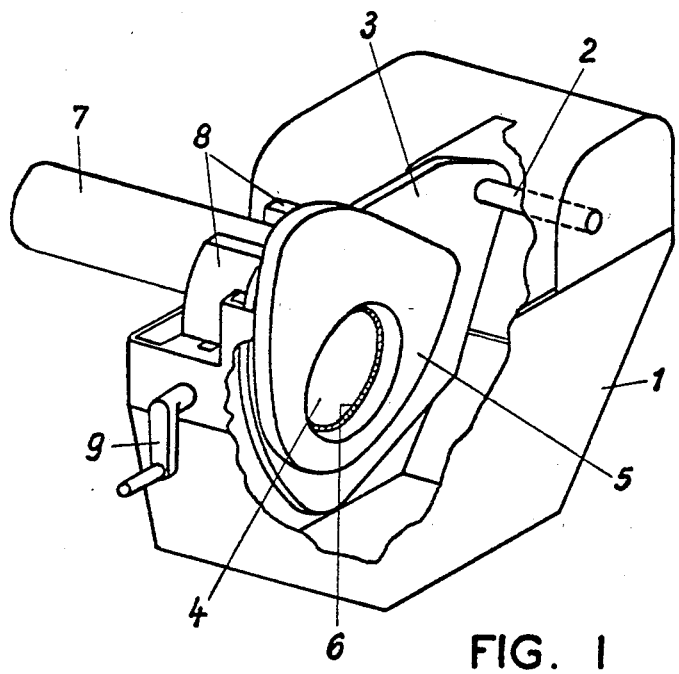
FIG. 1
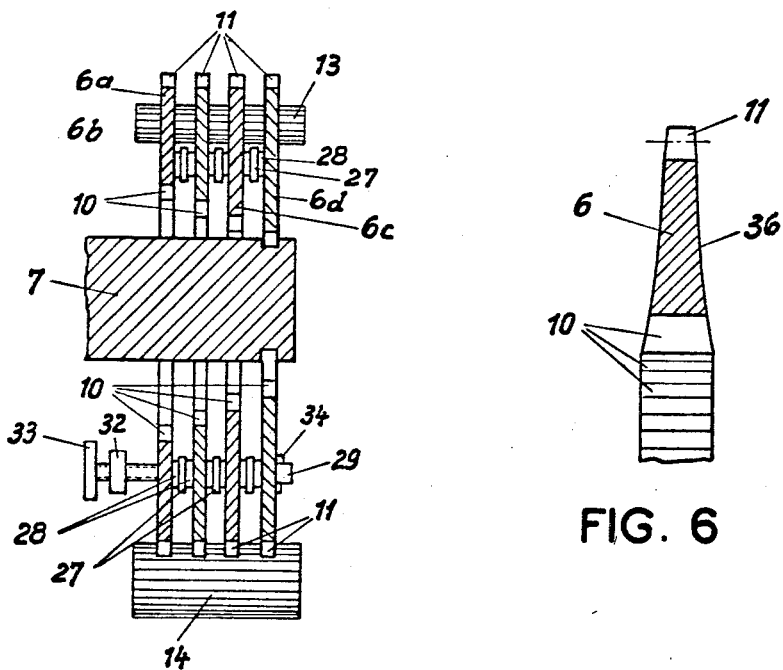
FIG. 5
FIG. 6
INVENTOR
Alfred Leyer
BY Owen, Wickham &
    Erickson
ATTORNEY Aug. 13, 1968     A. LEYER     3,396,618

COLD SAW

Filed May 31, 1966     4 Sheets-Sheet 2

INVENTOR
Alfred Leyer
BY Owen, Wickersham + Erickson
ATTORNEY

Aug. 13, 1968  A. LEYER  3,396,618
COLD SAW

Filed May 31, 1966  4 Sheets-Sheet 3

INVENTOR
Alfred Leyer
BY Owen, Wickersham &
Erickson
ATTORNEY

United States Patent Office 3,396,618
Patented Aug. 13, 1968

3,396,618
COLD SAW
Alfred Leyer, Dusseldorf, Germany, assignor, by mesne assignments, to W. R. Grace & Co., New York, N.Y., a corporation of Connecticut
Filed May 31, 1966, Ser. No. 553,807
Claims priority, application Germany, May 31, 1965
B 82,180
12 Claims. (Cl. 83—470)

ABSTRACT OF THE DISCLOSURE

In a cold saw having an annular blade with cutting teeth on the inner periphery and a toothed outer periphery, supported and driven by a plurality of drive and guide gears in engagement with the toothed outer periphery, the invention prolongs the life of these drive and guide gears by providing (a) gears substantially wider than the outer periphery of the annular blade and (b) low friction abutment means for positioning the blade laterally relative to the gears so that the blade can be moved into various lateral positions relative to the gears. Preferably, there are two idling gears and one drive gear located at 120° apart with the drive gear engaging the lowest point of the outer periphery of the blade.

---

The invention relates to an improved cold saw of the type having an annular saw blade with a toothed outer periphery in engagement with drive and guide gears, and with cutting teeth on its inner periphery, the saw blade together with the drive gears being mounted in a frame which is movable relative to the clamping device holding the workpiece, in a direction transverse to the axis of the workpiece.

Cold saws of this type have the advantage that relatively small annular saw blades can saw even very thick workpieces, provided that the diameter of the inner aperture is slightly larger than the diameter of the workpiece. This advantageous property is due to the fact that the teeth used for driving the blade are mounted directly on the outer periphery of the blade proper, rather than on a special wheel secured to the saw blade. Thus the saw blade can work its way through the workpiece over its entire width.

A further very important advantage of this type of cold saw construction is that the cutting surfaces are absolutely plane, since the part of the blade engaging the workpiece cannot be deflected by forces acting radially from the inside to the outside. The so-called "straying" of the saw blade is an important disadvantage of conventional circular saws and occurs particularly with saw blades of large diameter, such as are required for sawing thick workpieces. Straying of the cut can be alleviated only by increasing the thickness of the blades of the circular saw. This causes a correspondingly broader cut, the production of which necessitates considerably greater drive energies and causes considerable losses of material. Quite apart from this, the diameter of the blade of the circular saws must then have a diameter twice that of the workpiece, because the workpiece must be cut through before the fastening device provided in the middle of the saw blade comes into contact with the surface of the workpiece.

Since cold saws having annular saw blades can produce absolutely plane cutting surfaces, it is also possible to saw off very thin platelike portions from workpieces whose surface quality corresponds at least to workpieces which have been coarsely turned on the turning lathe. Thus, when using cold saws of the type described the surface treatments necessary for workpieces cut by circular saws become to a large extent superfluous.

As a result of the fact that even in very thick workpieces the cut is narrow, a considerably greater output is achieved, as compared with bow saws, despite the use of a relatively low-powered driving motor.

One feature of the present invention is that the drive and guide gears are considerably wider than the teeth mounted on the outer periphery of the saw blade. Another feature is that the lateral surfaces of the saw blade are laterally guided by low-friction abutments which are displaceable transversely to the lateral surfaces of the blade. These mechanical features lengthen the life of the toothed gears guiding and driving the saw blade, so that they are not prematurely worn; moreover, wear resulting in the course of operation is evenly distributed over the width of the toothed gears.

Adjustability of the abutments which laterally guide the annular saw blade need extend over a distance only half the width of the respective toothed gears if, as in this invention, the driving and guide gears are readjusted on the supporting axles. Thus, if the range of engagement between the outer teeth of the saw blade and the toothed gears has been displaced over the latter's half-width, the gears may be readjusted so that, again after gradual lateral displacement of the abutments, the plane of engagement between the saw blade and the toothed gears shifts over the hitherto still unused half of the toothed gears.

Correct guidance of annular saw blades which have a very large diameter, can be accomplished by this invention, by a drive gear at the lowest point of the outer periphery of the saw blade, and only two guide gears at an angle of about 120° thereto in the upper part of the blade periphery, the guide gears lying on the outer side adjacent two perpendicular tangents of the inner aperture of the saw blade. Between the two upper guide gears there thus remains a transverse clearance which corresponds at least to the inner diameter of the saw blade, so that, when the saw blade is moved to pass its upper part through the workpiece, there is no impediment between the guide gears and the workpiece; thus workpieces may be sawed which just fit into the inner aperture of the blade.

A simple and advantageous form of laterally guiding the saw blade is obtained by invention, by constructing the abutments which are displaceable transversely to the side surfaces of the saw blade, of threaded bolts which pass through corresponding threaded holes in the frame, which is movable transversely to the axis of the workpiece.

Friction between the abutments and the saw blade may be reduced by mounting antifriction bearings, such as ball bearings, on the ends of the threaded bolts which abut the saw blade. In accordance with the invention, a very simple and space-saving arrangement is obtained by providing the threaded bolts, with coatings of low-friction plastic, such as polyamide, at the ends abutting the side surfaces of the saw blade.

Lateral guiding of the saw blade is secured by two pairs of mutually aligned threaded bolts disposed on the opposite sides of the saw blade in a horizontal plane substantially bisecting the saw blade. This abutment arrangement does not impair the possibility of sawing thick workpieces whose cross-section fills almost the entire middle aperture of the saw blade. In order to keep shavings (which unavoidably accumulate during sawing of the workpiece), as far as possible away from the drive gear engaging the lower part of the outer periphery of the saw blade, the lower sector of the saw blade, within a range of less than 180°, is preferably covered over by a removable protective device.

In the area of the working zone of the saw blade, a conduit is preferably provided which feeds a cooling and lubricating fluid to the cutting area, the conduit being connected to a pressure pump. The orifice or orifices of the conduit can be so directed that penetration of the shavings in between guide and drive gears and the teeth on the blade's outer periphery is avoided.

Since, as already noted above, it is possible with a cold saw having an annular saw blade to produce absolutely plane cutting surfaces and to sever very thin plates from the workpiece, it is possible, in accordance with a further advantageous feature of the invention, to sever a plurality of such platelike workpieces by providing a plurality of saw blades which are kept spaced at a constant distance from each other by exchangeable spacer means, all of the saw blades being in engagement with the same guide and drive gears.

In order for the thus-severed platelike workpieces to be separated from each other successively, starting at the free end of the workpiece, the inner diameter of the saw blades preferably decreases in the direction of the free end of the workpiece. In this way, the individual cuts between the workpiece positions are completed successively, and the portion which has been completely severed is separated from the preceding one, so long as the latter is still connected to the workpiece.

Another feature of the invention enhances the cutting properties of the annular saw blades by providing the blade profiles with hollow-ground side surfaces, the inner teeth being broader in axial direction than the outer teeth, so that free surfaces are formed laterally on the cutting teeth for facilitating discharge of the shavings.

The invention is described in greater detail hereinbelow in connection with the embodiments illustrated in the drawings.

In the drawings:

FIG. 1 is a view in perspective, with some parts cut away of a cold saw embodying the principles of the invention;

FIG. 5 is a vertical section through the assembly of FIG. 4; and

FIG. 6 is an enlarged view in section of a portion of an annular saw blade of the invention.

Figure 2:
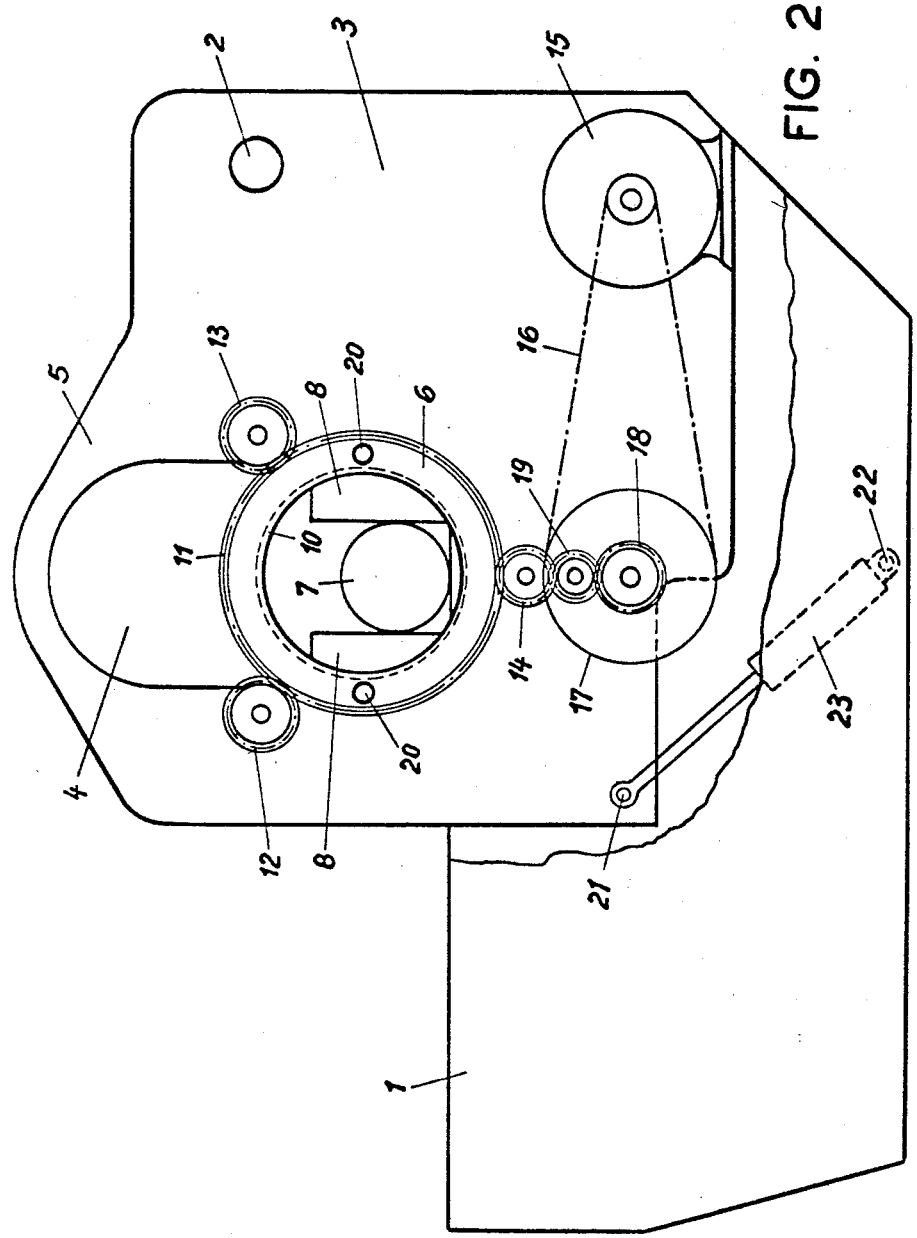
FIG. 2 is a view in side elevation, with some parts broken away, of the apparatus of FIG. 1.

FIG. 1 shows a frame 1 which also acts as a protective housing for the various devices. In the frame-housing 1, a shaft 2, rotatable about a horizontal axis, carries a swinging plate 3 having a recess 4. An annular saw blade 6 in the recess 4 is substantially covered by an openable cover 5. The drive and guide device for the saw blade 6 is also mounted on the plate 3, but is not shown in FIG. 1, nor is the drive which rotates the plate 3. The workpiece 7 to be sawed is held with the aid of a tensioning device 8, which may be opened and closed by means of a manual crank 9. The cover 5 is pulled high enough above the upper part of the saw blade 6 so that there is no impediment between the cover and the workpiece 7 when the plate 3 moves downwardly during cutting.

The details of the arrangement of the saw blade of FIG. 1 are shown in FIG. 2. The saw blade 6 has inner teeth 10 and outer teeth 11; the teeth 11 are guided at three points of its outer periphery spaced about 120° apart. In the blade's upper region the teeth 11 engage toothed guide gears 12 and 13, while a toothed gear 14 engages the lowermost point of the outer periphery of the blade 6 to transmit the driving force. The toothed gear 14 itself receives its driving force from an electric motor 15 secured to the plate 3, which drives a belt pulley 17 via an endless belt 16; a first bevel gear 18 is fixedly connected with the pulley 17 and drives a bevel gear 19, which engages the toothed gear 14. By suitable selection of the size of the belt pulleys and of the bevel gears, the speed of the motor 15 is reduced as required. The toothed gears 12, 13 and 14 are loosely supported, and their axes may be pulled away from the freely laterally projecting axes by releasing a locking device, and, conversely, they may be reinstalled. This expedient is part of the structure for preventing premature wear of the gears 12, 13 and 14; the gears are substantially broader (in axial direction) than the saw blade 6, and come into contact with the blade 6 at various parts of their periphery, as needed.

Axially displaceable abutments 20 take care of lateral guiding of the saw blade 6 and make possible transverse displacement of the saw blade 6 in relation to the gears 12, 13 and 14. The abutments 20 need be adjustable over a distance of only half the width of the gears 12, 13 and 14.

For swinging the plate 3, a pneumatic or hydraulic cylinder 23 is journaled to the plate 3 at a pivot 21 and to the frame 1 at a pivot 22. The cylinder 23 is preferably provided with an adjustable relief valve so that the downward speed of the plate 3 under its own weight may be adapted to the desired cutting speed. When supplied with a suitable pressure medium, the cylinder 23 returns the plate 3 to an upper position constituting at any time the starting position.

Figure 3:
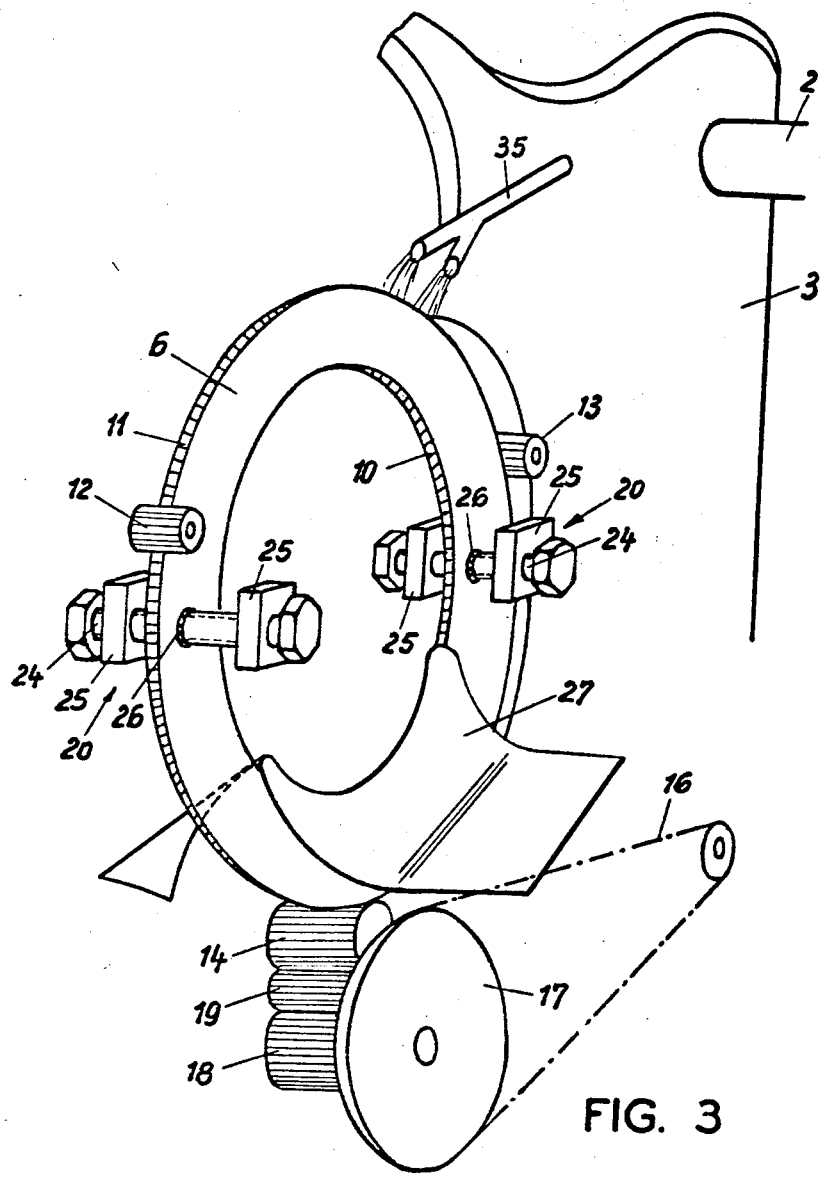
FIG. 3 is a view in perspective of the saw blade arrangement.

Radial and axial guiding of the saw blade 6 is schematically represented in FIG. 3. The toothed gears 12, 13 and 14 are disposed about the toothed outer periphery 11, about 120° apart. The lateral guide means comprises threaded bolts 24 disposed in pairs on opposite sides of the blade 6 and passing through abutments 25 that are fixedly mounted to the shaft 3 and have threaded bores. The ends of the bolts 24 abutting the side surfaces of the saw blade 6 are covered with low-friction coatings 26 of abrasion-resistant plastic material. By suitably adjusting the bolts 24 it is thereby possible to axially displace the running plane of the saw blade 6, if desired. As a result, the outer teeth 11 come into contact successively with the entire width of the teeth of the gears 12, 13 and 14. To insure uniform adjustment of the bolts 24 at all times, they are preferably provided with markings (not shown) which make it possible to read the prevailing adjustment on the markings opposite the brackets 25. In order to exploit the full width of the gears 12, 13 and 14 without having to make the amount of adjustability of the bolts 24 in transverse direction identical to the width of the toothed gears, the gears 12, 13 and 14 may be transposed on their supporting axes.

A conduit 35 feeds fluid for lubrication and cooling under pressure to the cutting zone. The orifices of the conduit 35 are so directed that the fluid simultaneously washes away part of the shavings and keeps them completely away from the point of engagement of the drive gear 14 with the outer periphery 11 of the saw blade 6. Further protection of the point of engagement on the toothed gear 14 is provided by a removable cover 27 which covers a sector of less than 180° in the lower part of the saw blade 6. The protective cover 27 keeps the severed portion of the workpiece from falling into the drive mechanism, i.e., into the gears 18 and 19 and the pulley 17.

Figure 4:
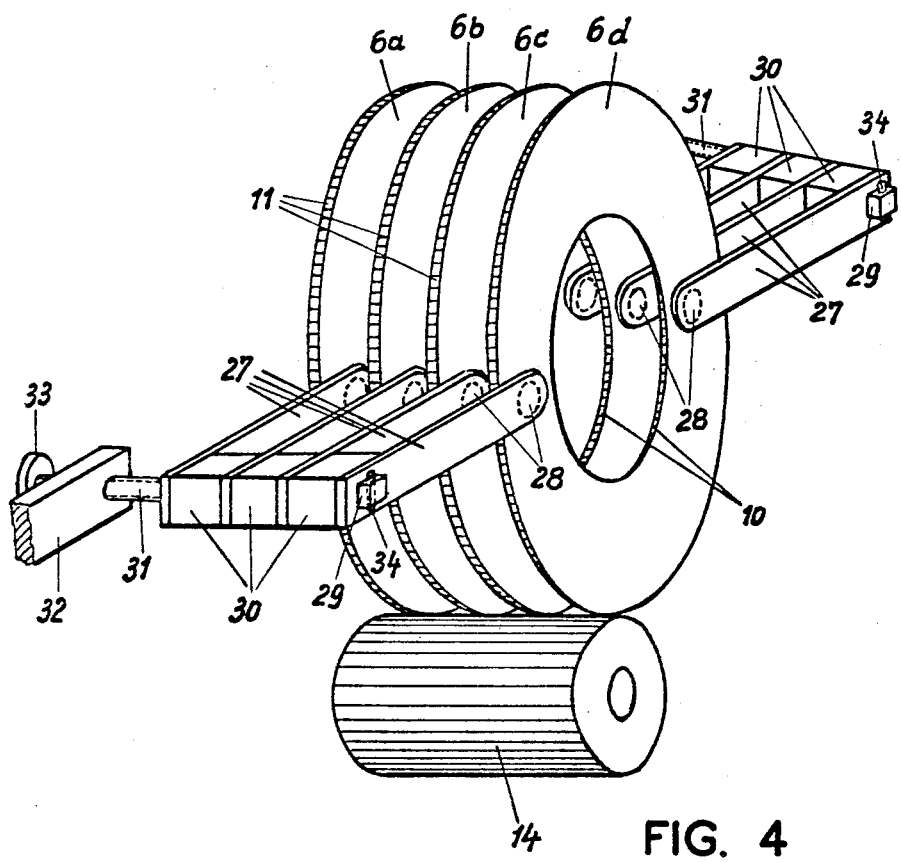
FIG. 4 is a partial view in perspective of a modified form of saw of the invention having a plurality of parallel saw blades.

A modified form of the invention is illustrated in FIG. 4. While retaining so far as possible the structural details of the device of FIGS. 1-3, a plurality of saw blades 6a-6d are here arranged in juxtaposition, and are all in engagement, by the lower part of their peripheries 11, with the drive gear 14. (The saw blades 6a-6d are additionally guided by guide gears like those in FIG. 3 in the region of their upper peripheral part, though these are not shown in FIG. 4.)

The device having a pluarity of juxtaposed saw blades 6a, 6b, 6c, and 6d serves the purpose of simultaneously severing a plurality of thin platelike portions from a workpiece. To ensure the required transverse clearance corresponding to the desired thickness of the severed workpieces while simultaneously axially guiding the individual blades, arms 27 engage between the individual saw blades 6a, 6b, 6c, and 6d, and further similar arms abut the outer side surfaces of the outer blades. Exchangeable low-friction and wear-resistant coats 28 of suitable plastic material are secured to the forward ends of the arms 27, the arms being thinner in transverse direction than the plastic coats on the arms engaging between the blades. The thickness of the coats in axial direction determines the distance between two adjacent saw blades and thereby the thickness of the plate severed between them from the workpiece.

The outer ends of the arms 27 are provided with polygonal apertures, an axle 29 of corresponding polygonal cross-section being keyed to them. In order to maintain at the axle 29 the desired transverse distance between the individual arms 27, spacing members 30 are interposed, these being removable and their size depending on the desired transverse distance. The block thus formed by the axle 29, the ends of the arms 27 and the spacer members 30 is transversely displaceable as a whole, because the section 31 of the axle is threaded and passes through a bracket 32, a corresponding threaded bore being secured on the shaft (though not shown). A handle 33 secured at the end at the end of the axle 31 is used for transverse displacement of the device. At the end of axle 29 opposite the handle 33, the arms 27 and the spacer members 30 are secured by a transverse pin 34 or by a wedge.

FIG. 5, a vertical section through the device of FIG. 4, shows that while the saw blades 6a, 6b, 6c, and 6d have identical outer diameters, they have inner diameters of different sizes. The saw blade 6d located nearest the free end of the workpiece 7 has the smallest inner diameter, while the blade 6a has the largest inner diameter. By this structure, the plate-like portion at the free end of the workpiece 7 is completely severed while the other portions still hang together.

With the arrangement illustrated in FIGS. 4 and 5, it is possible to saw off extraordinarily thin plate-like workpiece portions which, due to the special properties of the circular saw blades; have plane-parallel surfaces. It has, for example, been possible to sever plates as thin as 0.25 mm., even with materials which are normally difficult to saw.

Particularly advantageous operation of the cold saw of the invention is obtained by using saw blades 6 having the profile shown in FIG. 6. Here, the side surfaces 36 of the saw blade are concave between the outer teeth 11, which are axially narrower, and the inner cutting teeth 10, which are axially wider. Free surfaces are thereby obtained which favor frictionless discharge of the shavings.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A cold saw, including in combination:
   frame means having means for holding a workpiece,
   an annular blade having a toothed outer periphery and an inner periphery providing cutting teeth,
   blade support means secured to said frame means for rotatably supporting said blade for swinging movement transverse to the workpiece,
   a plurality of drive and guide gears in engagement with said toothed outer periphery, said gears being substantially wider than said outer periphery, and
   low-friction abutment means for positioning said blade laterally relative to said gears, whereby said blade can be moved into various lateral positions relative to said gears, thereby prolonging the life of said gears.

2. The saw of claim 1 wherein there are three said gears, two being idling gears and one a drive gear.

3. The saw of claim 1 wherein said drive and guide gears are identical and are removably mounted upon identical shafts.

4. The cold saw of claim 1 wherein one said gear is a drive gear located to engage the lowest point of the outer periphery of said blade, the other said gears comprising two idler gears located about 120° from said drive gear and from each other and laterally located outside two vertical lines tangent to the inner periphery of said blade.

5. The cold saw of claim 1 wherein said abutment means comprises threaded bolts secured to said blade support means.

6. The cold saw of claim 5 wherein said bolts have members for abutting the opposite sides of said blades, said members having low-friction plastic coating thereon.

7. The cold saw of claim 5 wherein there are two pairs of said bolts, each pair having one bolt on each side of the blade, said pairs being located substantially diametrically opposite each other.

8. The cold saw of claim 1 wherein a portion of the lower half of the saw blade is covered by a removable protective device.

9. The cold saw of claim 1 having conduit means in the region of the zone of operation of the saw blade for supplying a cooling and lubricating fluid to the cutting area, and a pressure pump connected to said conduit means for supplying said fluid thereto.

10. The cold saw of claim 1 having a plurality of saw blades and removable and interchangeable spacing members for spacing said blades apart from each other, all said blades engaging the same guide and drive gears.

11. The cold saw of claim 10 wherein the inner diameter of the saw blades successively decreases in diameter from one end of the assembly to the other.

12. The cold saw of claim 1 wherein the saw blade has in profile hollow ground side surfaces, the inner teeth being broader axially than the outer teeth.

References Cited

UNITED STATES PATENTS

| | | | |
|---|---|---|---|
| 1,063,789 | 6/1913 | Gorton | 143—44 X |
| 2,637,395 | 5/1953 | Muller | 83—504 |
| 3,086,567 | 4/1963 | Jetten | 143—44 |

WILLIAM S. LAWSON, *Primary Examiner.*